United States Patent [19]

Schwartz

[11] Patent Number: 4,520,239
[45] Date of Patent: May 28, 1985

[54] ELECTRICAL CORD REEL AND STORAGE SYSTEM

[75] Inventor: Frederic W. Schwartz, Providence, R.I.

[73] Assignee: Cable Electric Products, Inc., Providence, R.I.

[21] Appl. No.: 430,893

[22] Filed: Sep. 30, 1982

[51] Int. Cl.³ .................. H02G 11/02; B65H 75/40
[52] U.S. Cl. ..................... 191/12.4; 242/96; 339/113 L; 339/147 C
[58] Field of Search ............ 191/12.2 R, 12.4; 242/96, 115; 339/5 RL, 6 RL, 8 RL, 113 L, 119 C, 147 C, 157 C

[56] References Cited

U.S. PATENT DOCUMENTS

| | | | |
|---|---|---|---|
| 1,955,513 | 4/1934 | Peterson | 339/113 L |
| 2,480,401 | 8/1949 | Edwards | 191/12.4 |
| 2,856,470 | 10/1958 | Hyde | 191/12.4 |
| 3,369,084 | 2/1968 | Cook | 191/12.4 |
| 3,722,823 | 3/1973 | Reich et al. | 242/96 X |
| 3,837,448 | 9/1974 | Hagstrom | 191/12.4 |
| 3,870,133 | 3/1975 | Brennenstuhl | 191/12.2 R |
| 3,924,914 | 12/1975 | Banner | 339/113 L X |
| 4,020,308 | 4/1977 | Edwards, Jr. et al. | 339/113 L X |
| 4,134,635 | 1/1979 | Roche | 339/113 L X |
| 4,244,536 | 1/1981 | Harrill | 191/12.4 X |
| 4,282,954 | 8/1981 | Hill | 191/12.4 |
| 4,306,688 | 12/1981 | Hechler | 242/96 X |
| 4,318,461 | 3/1982 | Brorein | 191/12.2 R |
| 4,338,497 | 7/1982 | Drew | 191/12.4 |

FOREIGN PATENT DOCUMENTS 2444807  4/1976  Fed. Rep. of Germany ..... 191/12.4

*Primary Examiner*—Robert B. Reeves
*Assistant Examiner*—David F. Hubbuch
*Attorney, Agent, or Firm*—Paul J. Sutton

[57] ABSTRACT

The present invention features a device for storing an electrical extension cord. Generally users of an extension cord have a problem with storing the cord before and after use. The present invention provides a device for conveniently and simply extending precisely the amount or extension cord required and also enables the compact storage of the extension cord. The compact storage device is provided with a handle for convenient portability. The storage device is further provided with a direct connection to a multiple receptacle. The direct connection eliminates the problem of movable connections found on other storage devices. The device of the present invention also is provided with an indicator light which lights when the extension cord has been plugged into a source of electric power.

10 Claims, 19 Drawing Figures

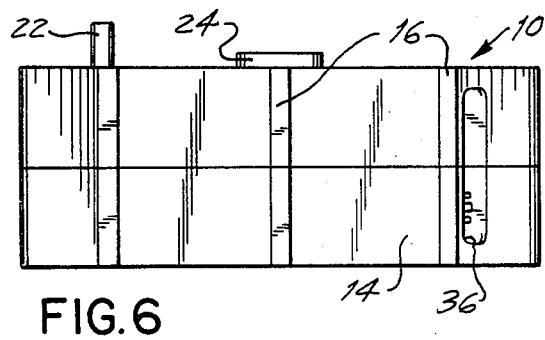
FIG.6
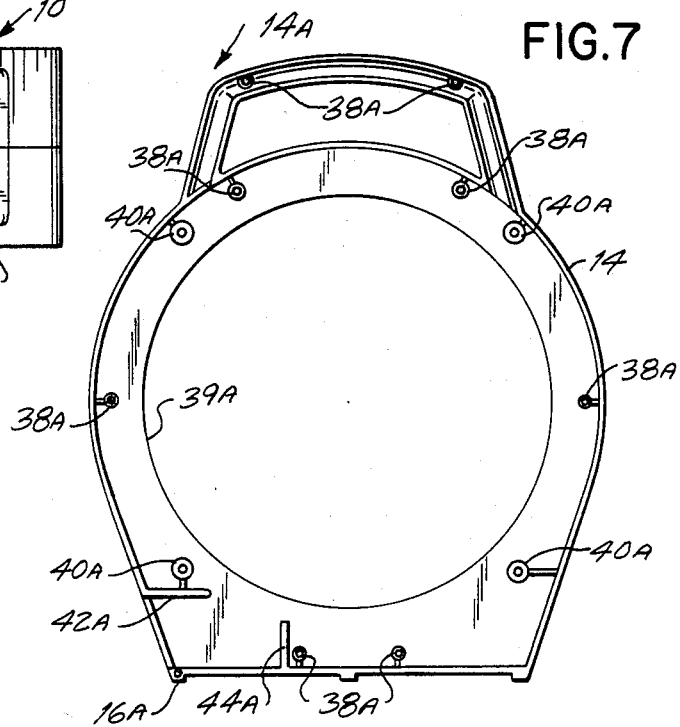
FIG.7
FIG.8 FIG.9
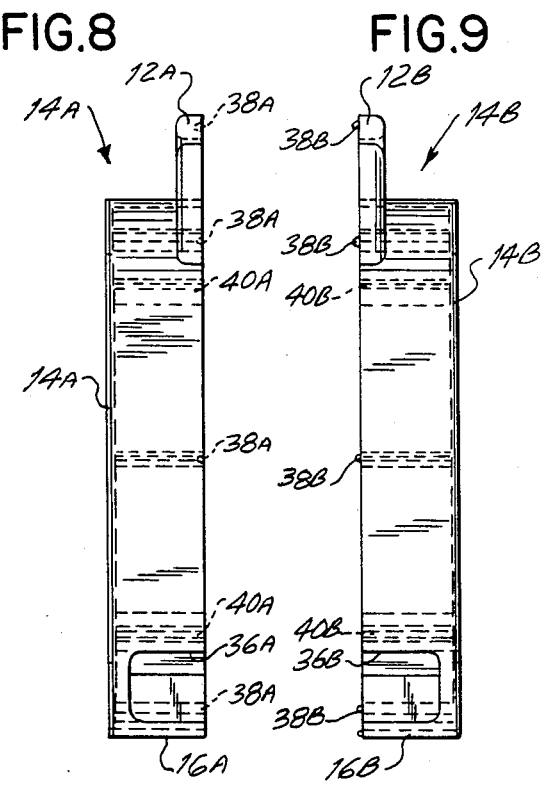
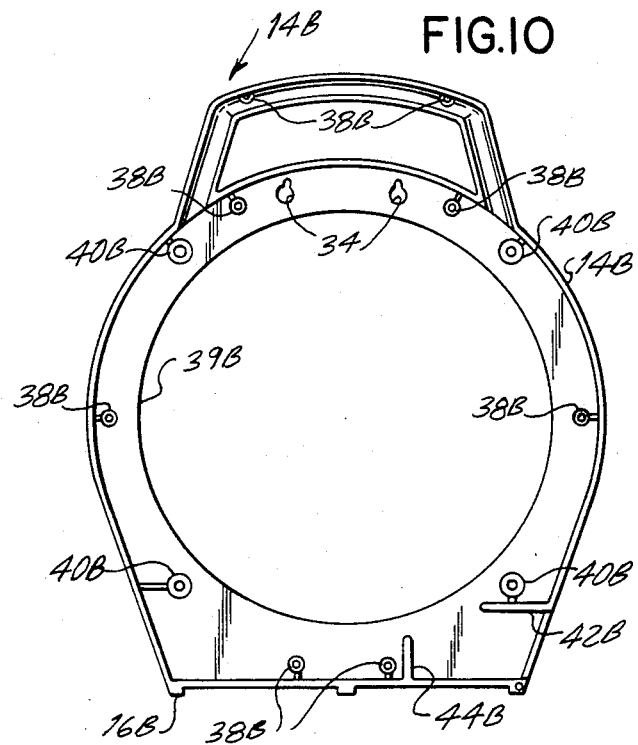
FIG.10

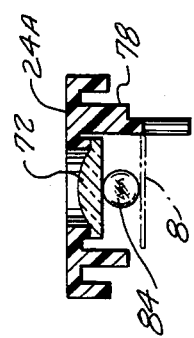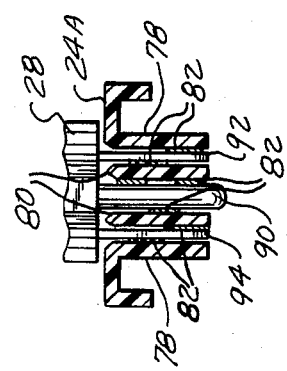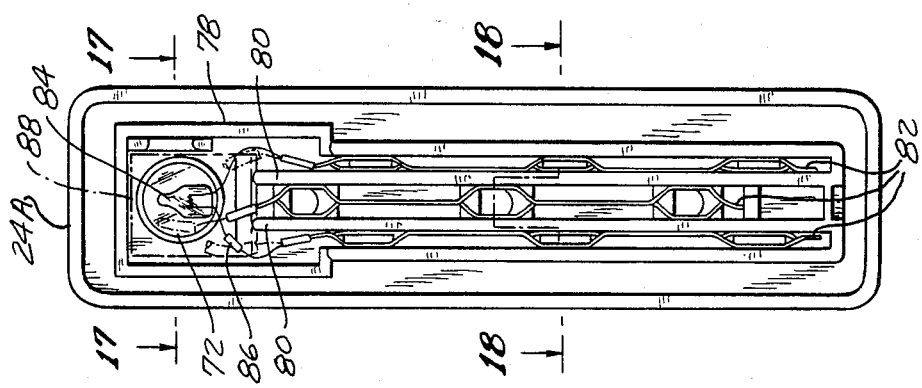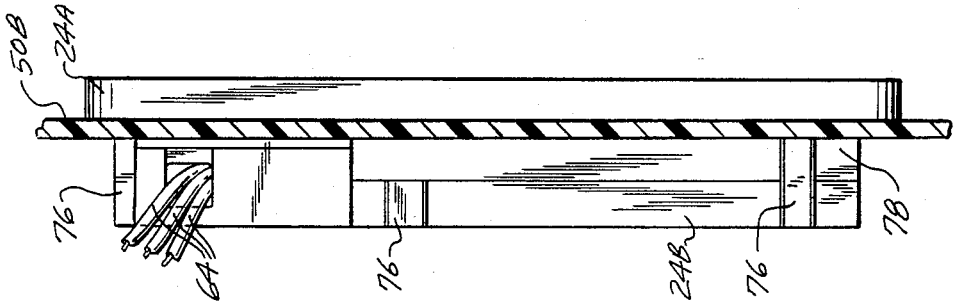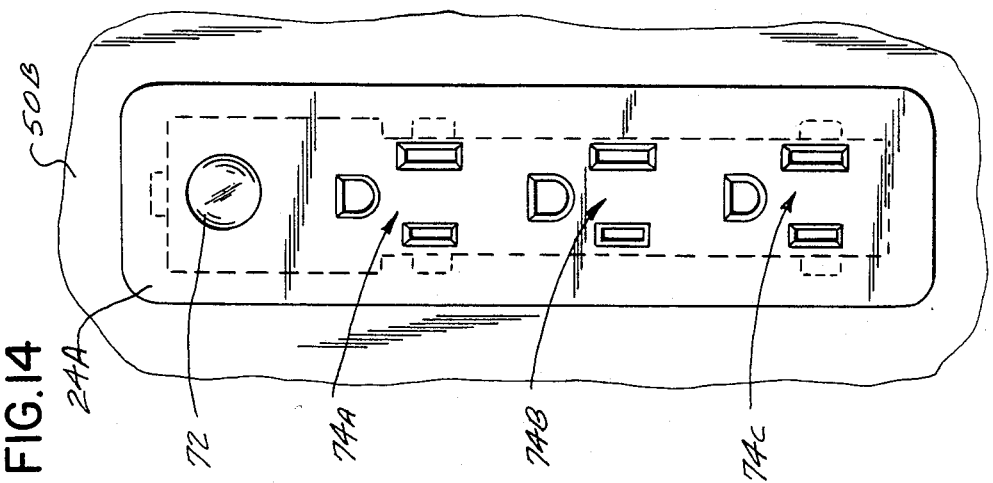

ELECTRICAL CORD REEL AND STORAGE SYSTEM

BACKGROUND OF THE INVENTION

1. Field of the Invention

This invention relates to storage devices for cords in general and specifically relates to a storage device for an electric cord.

2. Prior Art

Since the advent of electric power extension cords have been in constant use, for an equally long time the storage of these cords have been a problem. The most common method of storage is to wind the cord around the users hand and elbow resulting in a coil having the approximate diameter of the users lower arm. Such coils are still quite common and consist of multiple coils placed adjacent to one another. Since there is no means for the individual coils to retain their position relative to the other coils much tangling of the individual coils will take place. The resulting tangling would prevent the subsequent uncoiling of the electric cord without having to untangle the cord. Electric cords coiled on an arm cause a great deal of wasted time when they have to be untangled.

The next obvious step is to wind the cord on a form such as a drum or flat board. Here, the cord is supported by the form and the individual turns are substantially fixed in place. Winding the cord on a form may not be as convenient as winding it on one's arm but the fact that the cord will unwind without tangling outweighs the stated inconvenience.

Subsequently cord storage devices were designed and built containing a structure to support a drum upon which the electric cord could be wound and unwound. The drum was provided with a handle to rotate the drum. The support structure was provided with a receptacle for use with an appliance such as a portable electric drill. The support structure is stationary and the drum rotatable means must be provided for winding the electrical cord that conducts the electric current. In order to allow continuous rotation of the drum, slip rings are used for the electrical path. Slip rings are troublesome since electric conduction depends upon the cleanliness of a moving contact, namely, slip rings contacted by brushes. In order to construct a reliable storage device of the foregoing description much care in the manufacture must be used. The required care results in an expensive storage device affordable only by industrial users.

The present invention eliminates the need for slip rings and constructs the storage device of a moldable plastic material which results in a device affordable by craftsmen who may simply be interested in a relatively inexpensive electric cord storage device. The present invention therefore places the technology of these storage devices within the reach of a greater number of users.

SUMMARY OF THE INVENTION

An object of the present invention is to provide for a reliable and inexpensive storage device for an electric cord.

Another object of the present invention is to provide for a storage device having a multiplicity of receptacles.

Still another object of the present invention is to eliminate movable connections between the receptacles and the electric cord.

Yet another object of the present invention is to provide a means for indicating the presence of electric power at the receptacle.

A further object of this invention is to provide for an easily portable storage device.

A still further object of the present invention is to provide for a plastic storage device having minimum weight.

Other and further objects of the invention will be apparent from the following drawings and description of a preferred embodiment of the invention in which like reference numerals are used to designated like parts in various views.

DESCRIPTION OF THE DRAWINGS

FIG. 6 is a bottom view of the storage device;

FIG. 7 "A" portion of storage device enclosure internal view;

FIG. 8 is a side view of "A" portion;

FIG. 9 is a side view of "B" portion;

FIG. 10 "B" portion of storage device enclosure internal view;

FIG. 14 is a top view of mounted receptacle;

FIG. 15 is a side view of mounted receptacle;

FIG. 16 is an internal view of top portion of receptacle;

FIG. 17 is a view along 17—17 of FIG. 16;

FIG. 18 is a view along 18—18 of FIG. 16; and

DESCRIPTION OF THE PREFERRED EMBODIMENT

Figure 1:
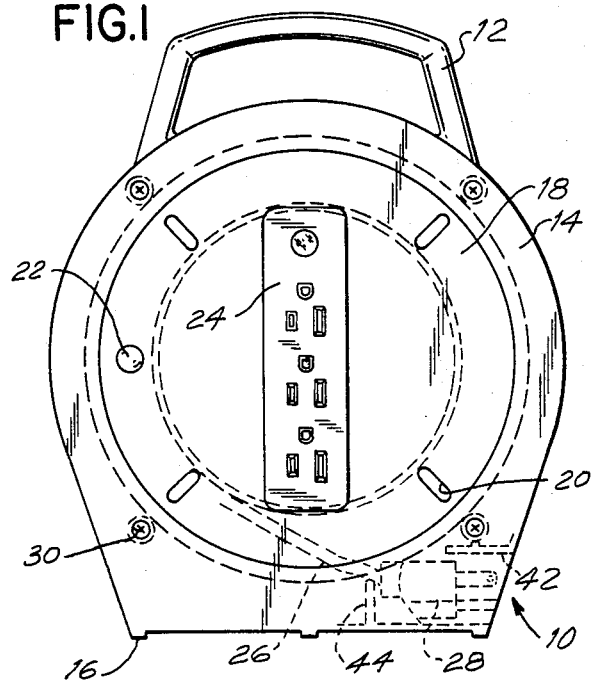
FIG. 1 is a front view of storage device of the present invention.

Reference to FIG. 1 shows a storage device 10 of the present invention. Seen here is a carrying handle 12 integrally attached to an enclosure 14. Having a reel 18 movably captured within the mid-body of the enclosure 14. The enclosure 14 is provided with a set of three pads 16 for protecting the enclosure 14 from wear as the storage device 10 is placed on a supporting surface such as the floor. The reel 18 is shown to be provided with a winding handle 22 for use in moving the reel 18. The enclosure 14 is comprised of two portions (to be described later) fastened together by means of fasteners placed within a set of enclosure fastener openings 30. The reel 18 is seen to have a set of viewing slots 20 which allow the user to see into the interior of the storage device 10 in order to observe an electric cord 26 which has been wound on the reel 18. The electric cord 26 enters the enclosure 14 by means of a cord access opening 36 (best seen in FIG. 3). The cord 26 is provided with a plug 28 for connection with the electric receptacle providing power to a receptacle 24 affixed to the reel 18. The plug 28 is housed within the enclosure 14 in the compartment formed by a vertical wall 44 and a horizontal wall 42 thereby protecting it.

Figure 2:
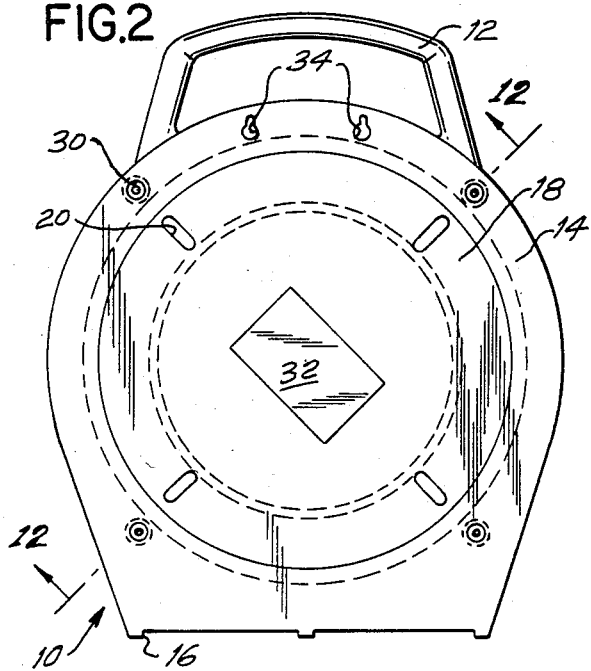
FIG. 2 is a rear view of storage device of the present invention.

FIG. 2 shows the rear view of the storage device 10. Shown in this view is the handle 12 on the top and the set of three pads 16 which are affixed to the enclosure 14. Also seen are the set of enclosure fastener openings 30 which cooperate with similar openings on the front view shown in FIG. 1. This rear view of FIG. 2 shows the reel 18 having a set of viewing slots 20 on this side too. The reel 18 also has affixed in a central location a label 32 giving the user instructions for use of the storage device 10. The rear view also shows a pair of storage openings 34 located at the top of the enclosure 14. The storage openings 34 allow the storage device 10 to be hung on a wall supported by nails or the like. The line 12—12 represents a section taken along that line which will be FIG. 12 (later described).

Figure 3:
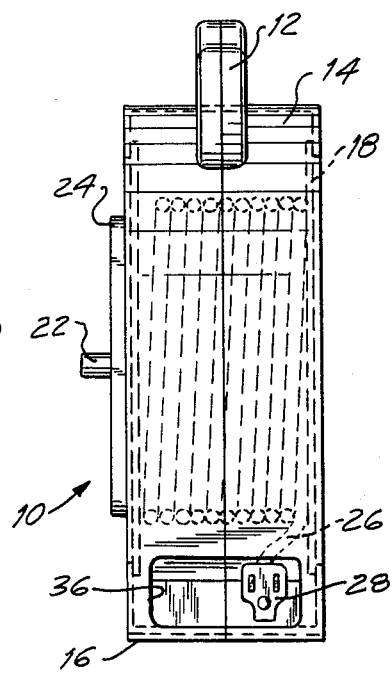
FIG. 3 is an opening side view of the storage device.

In FIG. 3 is seen the side view of the storage device 10 showing the relative positions of the carrying handle 12, the enclosure 14, one of the set of pads 16 and the reel 18. Shown also is the receptacle 24 and the winding knob 22. The side view of FIG. 3 also shows the cord access opening 36 and the plug 28 housed within the opening. Shown as a hidden item is the electric cord 26 stored on the reel 18.

Figure 4:
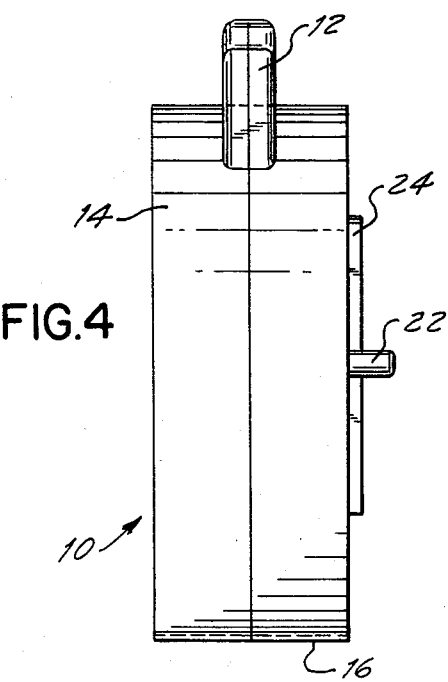
FIG. 4 is another side view of the storage device.

Reference to FIG. 4 shows the other side of the storage device 10. Here shown are the carrying handle 12, the enclosure 14 and one of the set of pads 16. The receptacle 24 and the winding handle is shown on the front of the storage device 10.

Figure 5:
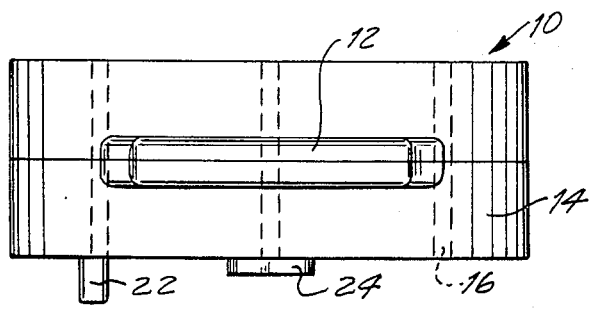
FIG. 5 is a top view of the storage device.

FIG. 5 shows the top view of the storage device 10 with the carrying handle 12 affixed to the enclosure 14 and the winding handle 22 and receptacle 24 visible. The set of pads 16 are seen as dotted lines being hidden by the enclosure 14.

In FIG. 6 is shown the bottom view of the storage device 10. Seen here are the set of three pads 16, the receptacle 24 and the winding handle 24.

FIG. 7 illustrates an "A" portion 14A of the enclosure 14. Description of the "A" portion 14A is a plastic molding and as such has several locating posts 38A provided with holes for receiving dowels which are located on cooperating locating posts. The "A" portion 14A is seen to have molded as an integral part a set of four enclosure spacer posts 40A. Each of the spacer posts 40A have the enclosure fastener opening 30. The "A" portion 14A is also seen to have a reel flange opening 39A, a cord access opening portion 36A, a horizontal wall portion 42A and a vertical wall portion 44A.

FIG. 9 is the side view of the "B" portion 14B of the enclosure 14. When FIG. 9 is taken together with FIG. 10 which is an internal view of the "B" portion 14B, a further understanding of the present invention will result. FIGS. 8 and 9 are arranged so that the two portions "A" and "B" are facing each other as they would when being assembled to form the enclosure 14. It can now be seen that the locating posts 38A and 38B will abut each other. In order to provide rigidity to the enclosure 14 where the "A" portion 14A and the "B" portion 14B adjoin the abutting locating posts 38A and 38B are provided with a dowel which is received by a cooperative hole.

Figure 11:
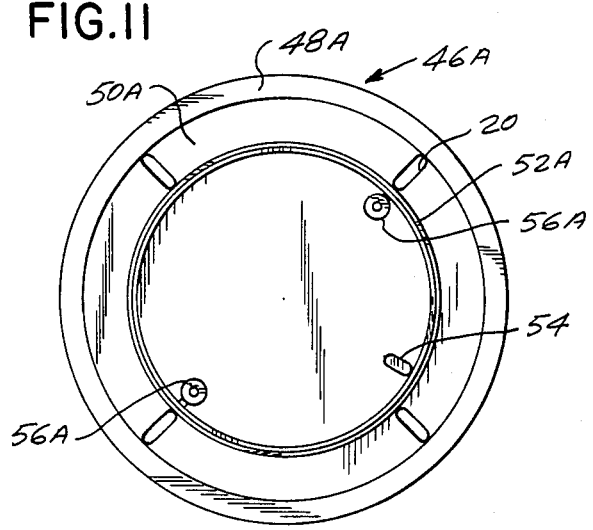
FIG. 11 is a internal view of "A" reel flange.
Figure 12:
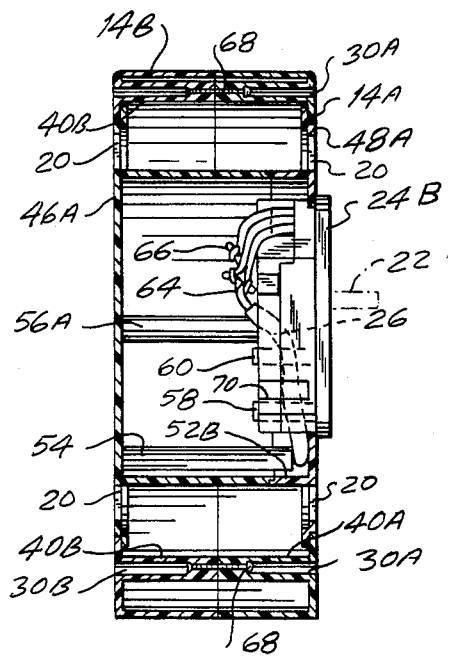
FIG. 12 is a view along 12—12 of FIG. 2.

FIG. 12 is the sectional view along line 12—12 of FIG. 2 viewed in the direction of the arrows. FIG. 12 taken together with FIG. 11 and FIG. 13 describe the construction of the reel 18. The section shown in FIG. 12 clearly shows the "A" portion 14A and the "B" portion 14B joined together to form the enclosure 14.

The enclosure spacer posts 40A and 40B are here shown abutting and the spacer posts are fastened together by a set of enclosure fasteners 68 which are self tapping screws. The spacer posts 40A and 40B serve to hold the "A" portion 14A and the "B" portion 14B the required distance apart to permit the reel 18 to move freely. Further, the enclosure spacer posts 40A and 40B serve as bearing points for a rear reel flange 46A and a front reel flange 46B. The periphery of a stepped outer portion 48A and 48B of the respective reel flanges 46A and 46B use the spacer posts 40A and 40B as bearing points. The outer periphery herein before referred to, therefore, does not bear on the reel flange openings 39A and 39B. It can be seen that the reel flanges are better seen in FIG. 13.

FIG. 14 is a top view of the receptacle 24 where a receptacle top portion 24A is shown affixed to a section of the outside surface of the inner flange portion 50B. The receptacle top portion 24A is seen to have a set of plug element openings 74A, 74B and 74C as well as a pilot light lens 72. FIG. 15 is a sectional side view of FIG. 14 showing the receptacle top portion 24A and the bottom portion 24B with the inner flange portion 50B sandwiched between. The receptacle top portion 24A is retained against the flange portion 50B by a set of receptacle retaining posts 76 molded integrally with the receptacle bottom portion 24B. The set of receptacle wires 64 is seen extending from an opening in the side of bottom portion 24B. Shown in FIG. 16 is the interior of the receptacle top portion 24A. Seen here is an outer wall 78 which forms the outside of top portion 24A within which is found a set of inner walls 80 which together with the outer wall 78 form the series of slots serving to retain a set of contact strips 82. Toward the left of FIG. 16 is seen a neon lamp 84 and a resistor 86 for use with the neon lamp 84. Below the neon lamp 84 is the pilot light lens 72. Shown as a dotted rectangle is an insulator 88. FIG. 17 which is a section taken along the line 17—17 of FIG. 16, clearly shows the relative positions of the lens 72, the neon lamp 84 and the insulator 88. The lens 72 disperses the light from the neon lamp 84 so as to fill the entire lens 72.

FIG. 18 shows a section taken along line 18—18 of FIG. 16. FIG. 18 shows the mechanism whereby contact is maintained between the rear reel flange 46A and the front reel flange 46B, each having in common the viewing slots 20 and a set of drum fastener posts 56A and 56B. The aforesaid drum fasteners posts 56A and 56B serve to fasten the reel flanges 46A and 46B together in the some fashion as the spacer posts 40A and 40B.

Figure 13:
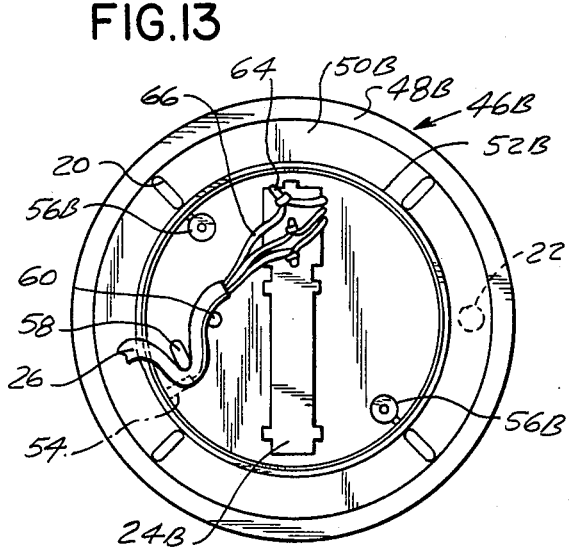
FIG. 13 is an internal view of "B" reel flange.

The rear reel flange 46A is provided with a drum body portion 52A, the extent of which can be seen in FIG. 12. The interior of the drum body portion 52A has affixed to it a cord retainer 54. The front reel flange 46B, shown in FIG. 13, is seen to have the winding handle 22 and a centrally located receptacles rear portion 24B fastened thereto. The receptacles rear portion 24B is seen to have protruding therefrom a set of receptacle wires 64 leading to a set of connectors 66. Turning our attention to the electric cord 26 we observe that it enters the interior of a drum body portion 52B affixed to the front reel flange opening 70 best seen in FIG. 12. The electric cord 26 then makes a bight about an anchor post 58 and runs between the anchor post 58 and a retaining post 60. Beyond the retaining post 60 the electric cord 26 is opened to expose a set of cord wires 62 which enter the set of connectors 66. The extent of the drum body portion 52B is best seen in FIG. 12. Close attention to the area in FIG. 13 where the electric cord 26 is shown will reveal the sectioning of a portion of the drum body portion 52B to show the anchor post 58 and more importantly the position of the cord retainer 54 and how it holds the electric cord 26 against the inside surface of inner flange portion 50B. The location of the cord retainer 54 is shown in solid lines in FIG. 12, dotted lines in FIG. 13. The elements seen extending from the plug 28 are a grounding pin 90, a wide blade 92 and a narrow blade 94. Reference to FIG. 18 and FIG. 16 shows that the contact strips 82 are separated into three portions which surround the elements of plug 28 in order to make electrical contact. The slots formed by the outer wall 78 and the set of inner walls 90 cause the portions of the contact strips 82 to provide contact pressure when the aforestated elements of the plug 28 are inserted into the receptacle 24.

Figure 19:
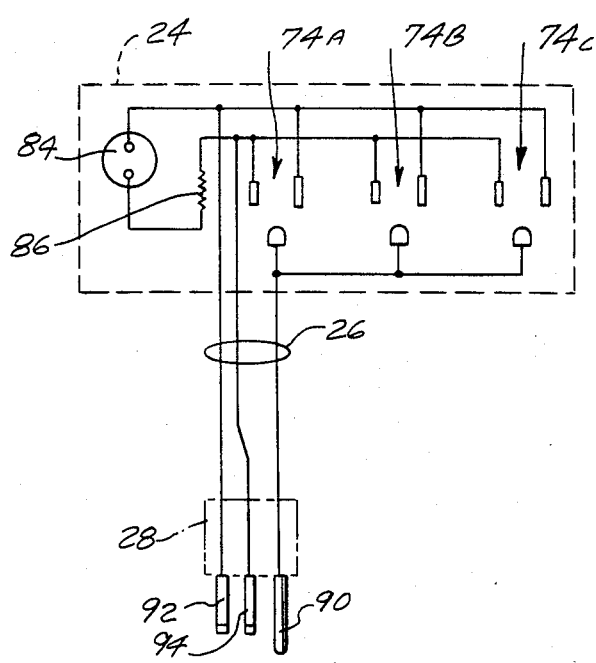
FIG. 19 is a schematic diagram illustrating the electrical connections within the device.

FIG. 19 is a schematic diagram illustrating the electrical connections within the storage device 10. Within the upper rectangle of dashed lines are the electrical connections housed within the receptacle 24. The electric cord 26 is shown running between the receptacle 24 and the plug 28. FIG. 14 shows that each set of plug element openings 74A, 74B and 74C consists of a wide rectangular slot, a narrow rectangular slot and a "D" shaped opening for grounding purposes. These openings are in turn connected to the elements of the plug 28 which correspond to the shade of the elements fitting the openings. The "D" shaped opening is an electrical ground and the other two slots are connected to the source of electrical current. Therefore the neon lamp 84 and the resistor 86 are connected to the source of current.

OPERATION OF THE PREFERRED EMBODIMENT

Before use the storage device 10 is in the condition shown in FIG. 3. The electric cord 26 has been fully retracted within the enclosure 14 by operating the winding handle 22 so as to wind the cord 26 onto the reel 18. When the electric cord 26 is fully wound onto the reel 18 the plug 28 has entered the cord access opening 36. When the electric cord 26 is fully retracted the storage device 10 presents a clean smooth enclosure which will not catch upon or entangle other cords or enclosures. Nor will the storage device 10 present any sharp edges with which the user can injure himself or others. The use of a light plastic for the enclosure 14 and the reel 18 results in the storage device 10 weighing less than the electric cord 26 which it houses. Although the present invention stores 25 feet of electric cord 26 it is not limited to that quantity. The presence of the storage openings 34 allows the storage device to be hung on a wall thereby removing it from the floor. The use of an impact resistant plastic such as ABS for molding purposes results in a durable storage device 10 that will not be damaged by unintentional blows. Other plastics may be used if other qualities are considered of greater importance. In use the storage device 10 is placed in the work area and the plug 28 is grasped with the fingers and pulled out causing the cord 26 to follow. When sufficient cord 26 has been removed to reach a source of current, the plug 26 is inserted in this source of current. As soon as the receptacle 24 is energized the pilot light lens 72 will fill with light from the neon lamp 84. This provides a convenient indication that the receptacle 24 is energized and that the tools plugged into the receptacle 24 should operate, if not defective. The pilot light lens 72 will also provide a convenient means for checking the operation of the power source. If the power source is faulty it will be shown on the pilot light lens 72. The viewing slots 20 found on both sides of the reel 18 enable the user to check on the amount of electric cord 26 remaining on the drum body 52 portion of the reel 18.

The direct connection of the electric cord 26 to the receptacle 24 results in a less expensive and more reliable storage device 10.

It is to be appreciated that modifications and variations may be made to the preferred embodiment of the invention described herein without departing from the spirit and scope of the invention which is defined in the following claims.

What is claimed is:

1. A storage device for an electric cord, comprising:
   two mating sections defining a housing, said housing having means defining a central opening;
   an electric cord having a plug;
   a reel for supporting and storing said electric cord, said reel being rotatable within said housing, said electric cord being wound upon said reel when said reel is caused to rotate;
   a receptacle affixed to said reel having a plurality of electric plug element openings;
   means for indicating the presence of an electric potential at said receptacle, when said plug is inserted into an electrical source;
   a pair of reel flanges disposed upon said reel for supporting said electric cord; and
   a plurality of spacer posts having the dual purpose of providing a given spacing between each section of said housing, and being in contact support of said reel flanges to provide extra support for winding said electric cord upon said reel.

2. Said device of claim 1 wherein said housing is provided with a cord access opening for allowing said electric cord access to the interior of said device.

3. Said device of claim 2 wherein said housing is provided with a carrying handle.

4. Said device of claim 3 wherein said pair of flanges is provided with a winding handle.

5. Said device of claim 4 wherein said pair of flanges is provided with a plurality of viewing slots.

6. The device of claim 5 wherein said housing is comprised of two portions connected together by a plurality of fasteners.

7. The device of claim 6 wherein said reel is comprised of two portions connected together by a plurality of fasteners.

8. The device of claim 7 wherein said means for indicating is comprised of a neon lamp.

9. The device of claim 8 wherein said receptacle is provided with a light diffusing lens for making said neon lamp more visible.

10. The device of claim 9 wherein said plug element openings each have an opening for grounding purposes and said plug has a grounding pin.

* * * * *